United States Patent
Goldberg

(10) Patent No.: US 11,941,092 B2
(45) Date of Patent: Mar. 26, 2024

(54) TECHNIQUES FOR LAUNCHING APPLICATIONS BASED ON PARTIAL SIGNATURE VALIDATION

(71) Applicant: SATURN LICENSING LLC, New York, NY (US)

(72) Inventor: Adam Michael Goldberg, Fairfax, VA (US)

(73) Assignee: SATURN LICENSING LLC, New York, NY (US)

( * ) Notice: Subject to any disclaimer, the term of this patent is extended or adjusted under 35 U.S.C. 154(b) by 861 days.

(21) Appl. No.: 16/784,023

(22) Filed: Feb. 6, 2020

(65) Prior Publication Data

US 2021/0248211 A1    Aug. 12, 2021

(51) Int. Cl.
| | |
|---|---|
| G06F 21/12 | (2013.01) |
| G06F 21/33 | (2013.01) |
| H04L 9/32 | (2006.01) |
| H04L 9/40 | (2022.01) |
| H04N 21/462 | (2011.01) |
| H04N 21/47 | (2011.01) |
| H04N 21/478 | (2011.01) |
| H04N 21/8545 | (2011.01) |

(52) U.S. Cl.
CPC .......... G06F 21/121 (2013.01); G06F 21/33 (2013.01); H04L 63/12 (2013.01); H04N 21/47 (2013.01); H04N 21/478 (2013.01); H04N 21/8545 (2013.01); H04L 9/3268 (2013.01); H04N 21/4622 (2013.01)

(58) Field of Classification Search
CPC ....... G06F 21/121; G06F 21/33; H04L 63/12; H04L 9/3268; H04N 21/47; H04N 21/478; H04N 21/8545; H04N 21/4622
See application file for complete search history.

(56) References Cited

U.S. PATENT DOCUMENTS

| | | | |
|---|---|---|---|
| 2002/0104097 A1* | 8/2002 | Jerding | H04L 69/24 725/115 |
| 2004/0025049 A1* | 2/2004 | Zunke | G06F 21/121 726/16 |
| 2006/0101408 A1* | 5/2006 | Kotamarthi | G06F 21/52 726/21 |
| 2006/0274612 A1* | 12/2006 | Kim | H04L 67/06 369/30.04 |
| 2009/0089579 A1* | 4/2009 | Murase | G06F 21/575 713/164 |

(Continued)

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.

(Continued)

*Primary Examiner* — Jeremy S Duffield
(74) *Attorney, Agent, or Firm* — Chris Kolefas

(57) ABSTRACT

Techniques are described for expanding and/or improving the Advanced Television Systems Committee (ATSC) 3.0 television protocol in robustly delivering the next generation broadcast television services. ATSC 3.0 applications may be launched based on partial validation, e.g., as soon as one level of validation passes, with ensuing layers being authenticated as the application commences launch and with launch being stopped if any layer fails validation.

21 Claims, 7 Drawing Sheets

(56) References Cited

U.S. PATENT DOCUMENTS

| | | | | |
|---|---|---|---|---|
| 2010/0138665 | A1* | 6/2010 | Kusudo | H04N 21/4345 713/181 |
| 2011/0004895 | A1* | 1/2011 | Ladd | H04N 21/25875 725/89 |
| 2012/0266259 | A1* | 10/2012 | Lewis | G06F 21/51 726/30 |
| 2016/0286279 | A1* | 9/2016 | Yang | H04N 21/4826 |
| 2019/0026444 | A1* | 1/2019 | Yamagishi | H04H 60/14 |
| 2020/0159931 | A1* | 5/2020 | Schutt | G06F 21/575 |

OTHER PUBLICATIONS

"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.

"ATSC Standard: ATSC 3.0 Interactive Content (A/344)", May 2, 2019.

"ATSC Standard: ATSC 3.0 Security and Service Protection", Aug. 20, 2019.

"ATSC Standard: ATSC 3.0 System", Sep. 17, 2019.

"ATSC Standard: Signaling, Delivery, Synchronization, and Error Protection (A/331)", Jun. 19, 2019.

"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.

"RFC 5289, TLS Elliptic Curve Cipher Suites with SHA-256/384 and AES Galois Counter Mode (GCM)," E. Rescorla, Internet Engineering Task Force, Fremont, CA, Aug. 2008.

"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.

"RFC 5652, Cryptographic Message Syntax (CMS)," R. Housley, Internet Engineering Task Force, Fremont, CA, Sep. 2009.

"RFC 5751, Secure/Multipurpose Internet Mail Extensions (S/MIME) Version 3.Message Specification," B. Ramsdell, S. Turner, Internet Engineering Task Force, Fremont, CA, Jan. 2010.

"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.

"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.

"RFC 5940, Additional Cryptographic Message Syntax (CMS) Revocation Information Choices," S. Turner, R. Housley, Internet Engineering Task Force, Fremont, CA, Aug. 2010.

"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.

"RFC 5019, The Lightweight Online Certificate Status Protocol (OCSP) Profile for High-Volume Environments," A. Deacon, R. Hurst, Internet Engineering Task Force, Fremont, CA, Sep. 2007.

\* cited by examiner

OCSP = Online certificate status protocol

TECHNIQUES FOR LAUNCHING APPLICATIONS BASED ON PARTIAL SIGNATURE VALIDATION

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in ATSC A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, digital TV typically requires the use of software applications that are often launched only after all levels of signature validation down to the root pass validation checks. For example, for a signature signed by an end-entity user certificate to be trusted, that certificate must have been issued by a certificate authority (CA) that is included in the trusted store of the device that is connecting, or if the certificate was not issued by a trusted CA, the validating device must then check to see if the certificate of the issuing CA was issued by a trusted CA, and so on down to the "root" certificate until a trusted CA is found. This can cause unwanted delay in, e.g., ATSC 3.0 channel change times.

Accordingly, a digital television system includes at least one receiver configured to receive digital TV from a transmitter assembly with at least one broadcast source and at least one broadband source. The receiver includes at least one processor programmed with instructions to commence a multi-step validation of at least one application received from the transmitter assembly. The multi-level validation includes an initial step, a final step, and plural intermediate steps therebetween. The instructions are executable to, responsive to successful validation of a first step within the multi-level validation, commence loading and launching the application. The first step may be an initial step or any of the intermediate steps but is not the final step. The instructions are also executable to, responsive to unsuccessful validation of any step after the first step is validated, unload and terminate the application.

In some examples the application can include an advanced television systems committee (ATSC) 3.0 broadcaster application configured to insert replacement content into content received by the receiver from the transmitter assembly.

In example embodiments the instructions can be executable to commence execution of the application after loading the application and prior to completing validation of the application, and use the application to present first content before second content at least in part based on identifying that the first content has higher priority than the second content.

In another aspect, a digital television system includes at least one receiver having at least one processor programmed with instructions to configure the processor to receive a signal to execute an application, and commence validation of the application. The instructions are executable to, prior to completing validation, launch the application and execute the application until such time as a validation step fails, responsive to which the application is terminated.

In another aspect, in a digital television system, a method includes executing an application (app) to present content based on a successful validation check in a series of validation security checks of the app prior to completing all validation checks of the app. The method also includes, while executing the app to present content, continuing to validate the app either until all validation checks have been completed, or upon determining that a validation check has failed, in response to which execution of the app is terminated.

The details of the present application, both as to its structure and operation, can best be understood in reference to the accompanying drawings, in which like reference numerals refer to like parts, and in which:

BRIEF DESCRIPTION OF THE DRAWINGS

FIG. 8 is a diagram illustrating certificate relationships, and.

DETAILED DESCRIPTION

Figure 1:
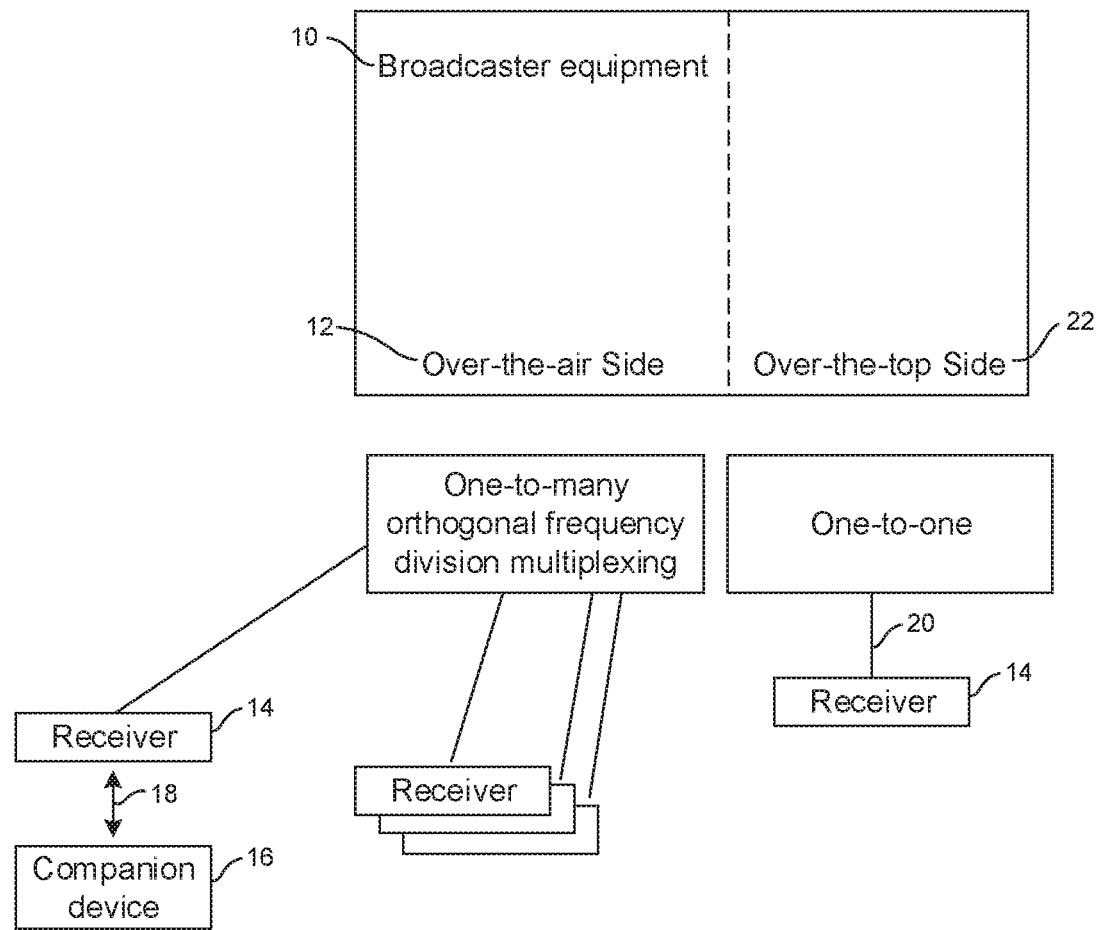
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access web sites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/Javascript, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
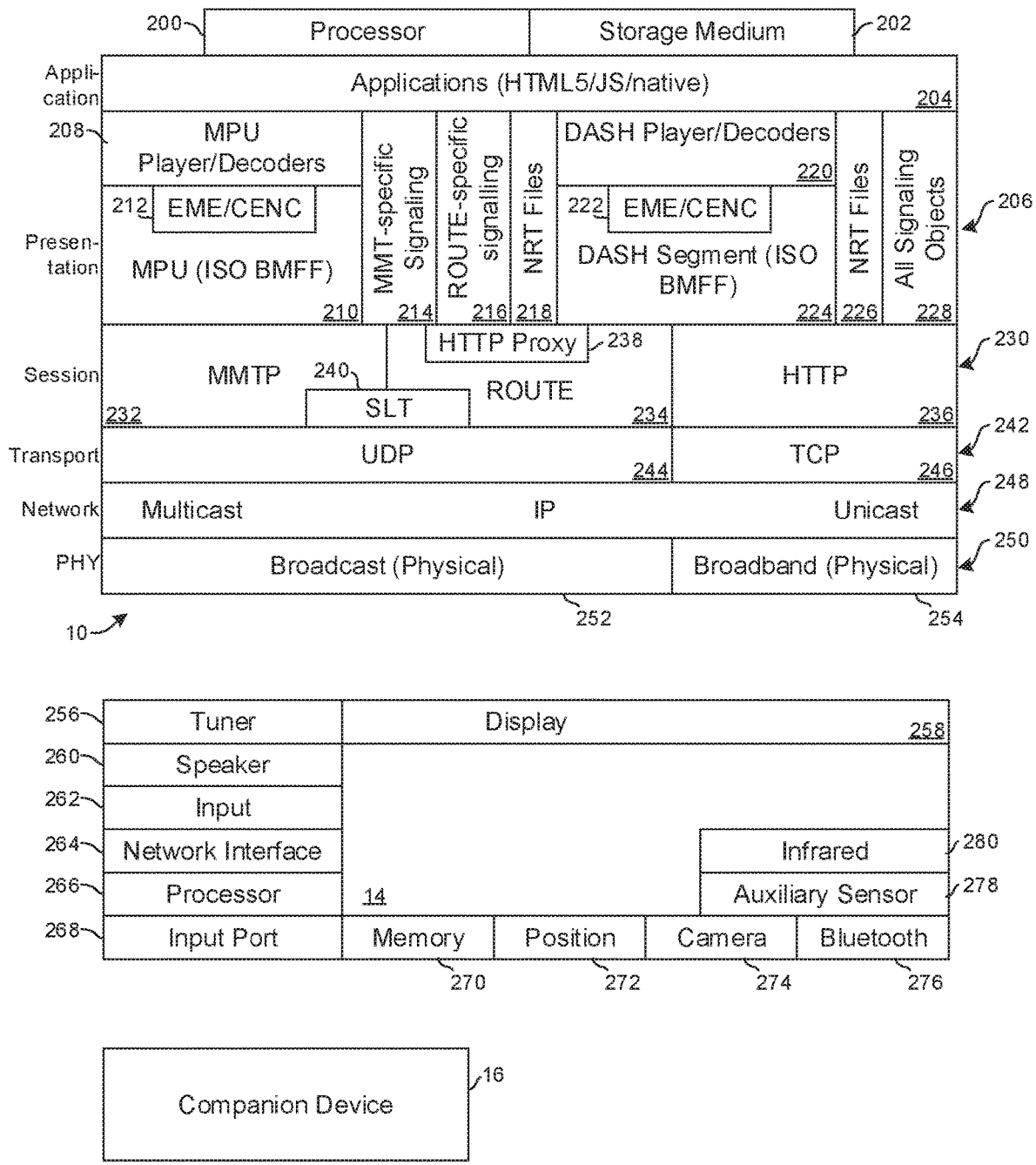
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile formatted data sent through the various protocols (HTTP/TCP/IP) in the protocol stack may be used on the broadband side. Media files in the DASH-IF profile formatted data based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
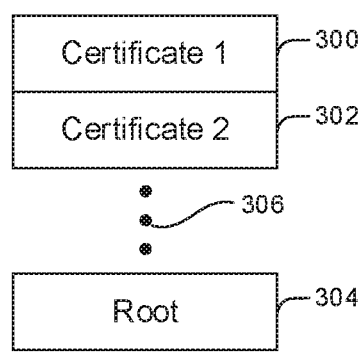
FIG. 3 is a diagram of a certification layer.

Now referring to FIG. 3, an example series of security certificates is shown, beginning with an end-entity certificate 300 that may be, e.g., a certificate issued for ATSC 3.0 signing. FIG. 3 assumes that the end-entity certificate was issued by a CA with an intermediate level certificate "B" 302, which in turn was issued by a root CA with a root certificate 304. A certificate chain may have greater than three levels as indicated by the ellipsis 306. Similarly, a certificate chain may have only two certificates, the end-entity certificate 300 and the root certificate 304, and not have an intermediate level certificate "B" 302.

Figure 4:
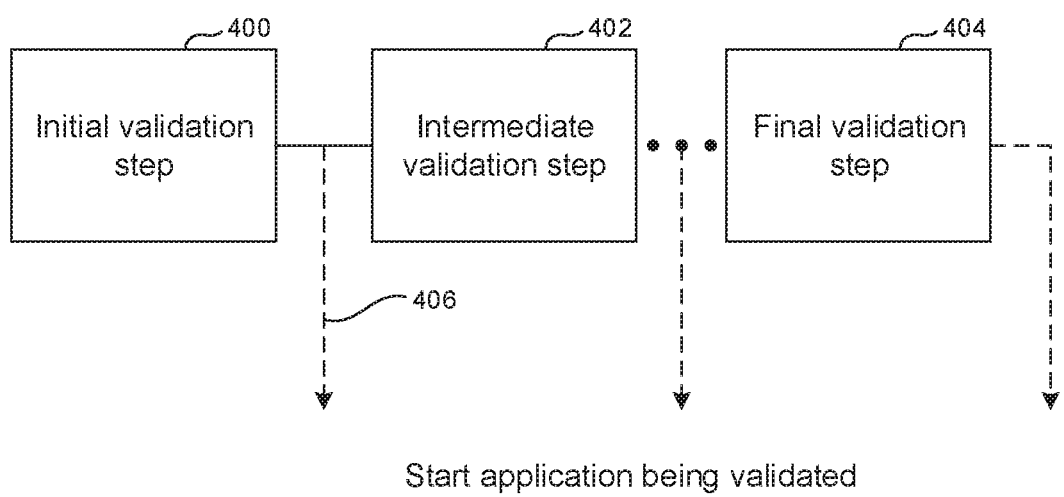
FIG. 4 is a diagram illustrating that application load and execution may occur at any intermediate step as desired prior to competing the final validation step.

With FIG. 3 in mind, attention is turned to FIG. 4. FIG. 4 illustrates a multi-step validation process (i.e., a sequence of validation checks) with an initial validation step 400, one or more intermediate validation steps 402, and a final validation step 404. As indicated by the dashed lines 406, the app being validated may be loaded and execution begun after successful execution of any of the steps shown including after the initial step 400, although for present purposes the app being validated may be loaded and execution begun prior to successful completion of the final validation step 404. ATSC 3.0 A/360 with referenced certificate validation publications gives an example of such a sequence of validation checks, including verifying certificate signatures, verifying author signatures, verifying ancillary data in certificates, checking for correct certificate version number, verifying a certificate has not been revoked, etc.

Figure 5:
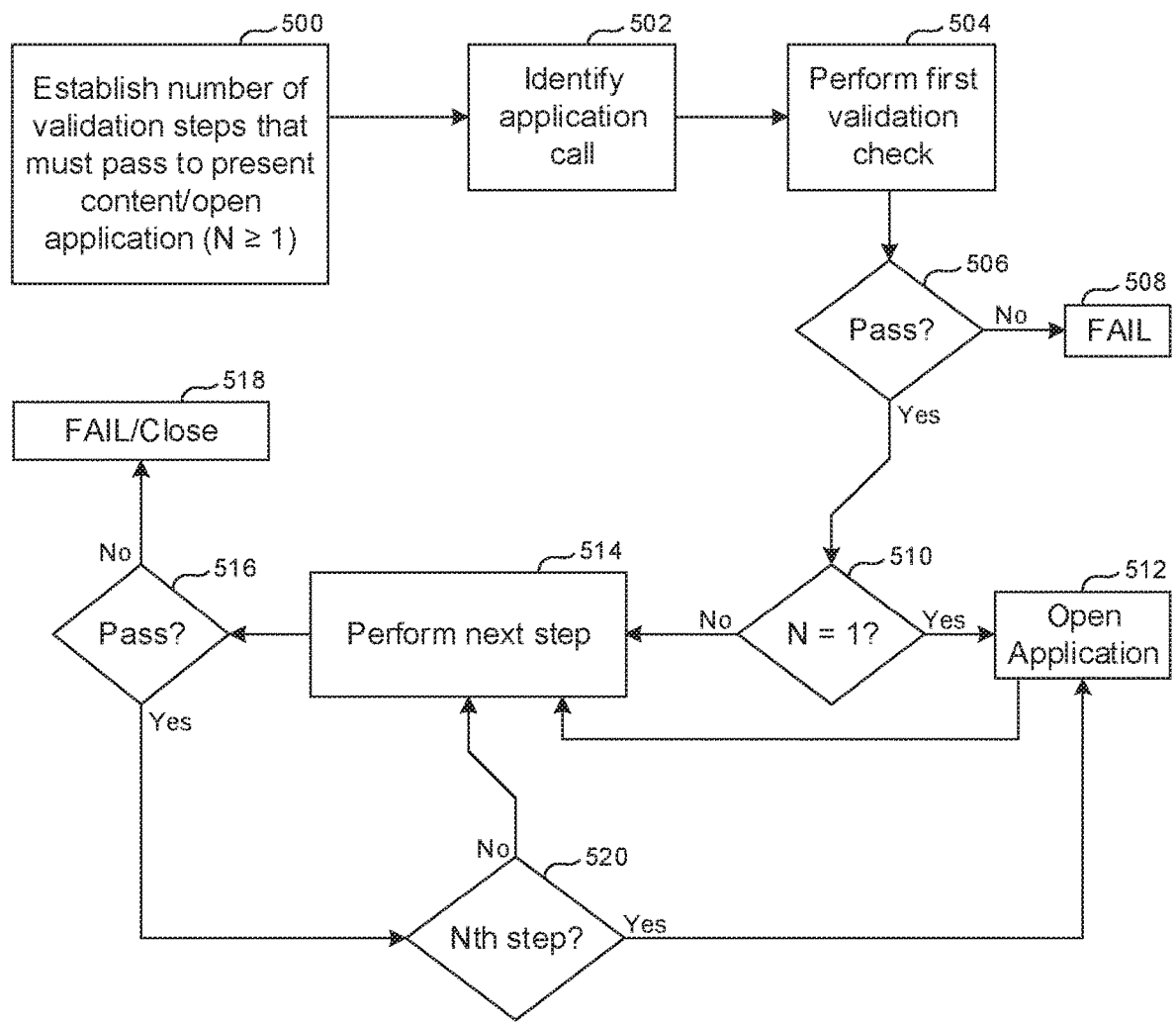
FIG. 5 is a flow chart illustrating example logic consistent with present principles.

FIG. 5 uses flow chart form to illustrate logic consistent with present principles. Note that while FIG. 5 illustrates a particular order of steps, such as that after the end-entity certificate validates, then the application can be launched, it is to be understood that which checks and how many checks must be passed successfully before launching may both be variable and may be determined by the receiver software.

Block 500 indicates that an administrator for example may decide which $N^{th}$ step of the multi-step validation process (N≥1) must be successfully completed before the related application is loaded and executed. Note that alternatively, as alluded to above a receiver the first time it validates an application from a particular broadcaster can run through a larger set of the validation tests before launching, and then subsequently decrease the number of checks necessary before launching. That is, the amount of trust in a broadcaster may grow over time. A balance is struck between speed and security. The fastest speed is achieved by allowing the app to be loaded and run after success of the initial validation step 400 (N=1). Greater security is achieved by allowing the app to be loaded and run only after success of an intermediate step 402, with the more steps required to load and execute the app providing greater security at slower speed.

Block 502 indicates that a call to load and execute an application is identified. This may be, e.g., a signal for channel change/access of a broadband ATSC 3.0 channel which requires execution of a broadcaster application (BA) that has security certificates.

The initial validation step 400 is performed at block 504. If the step fails at decision diamond 506, the validation fails at state 508 and ends, without loading and executing the app.

On the other hand, if the initial step passes and it is identified as indicated at decision diamond 510 that the number of successful steps to be executed to open the app equals one (1), the app is loaded into memory and execution commenced at state 512. From state 512 or if it is determined that N>1 as indicated by diamond 510, the logic moves to block 514 to perform the next step in the chain of validation checks.

If the next step fails as indicated by decision diamond 516, the validation fails at state 518 and the app, if loaded at block 512, is stopped from executing and moreover may be unloaded from memory, and if desired a virus check performed. On the other hand, if the next step at block 514 passes as indicated at diamond 516, it is determined whether the next step at block 514 is the $N^{th}$ step established at block 500. If it is, the logic moves to block 512 to load and open the app (or to continue executing the app if it was opened at a previous step) and then the next step in the chain is performed at block 514. The process continues until either all steps have been successfully completed and the app continues to be executed or until any step fails and the app is torn down.

Figure 6:
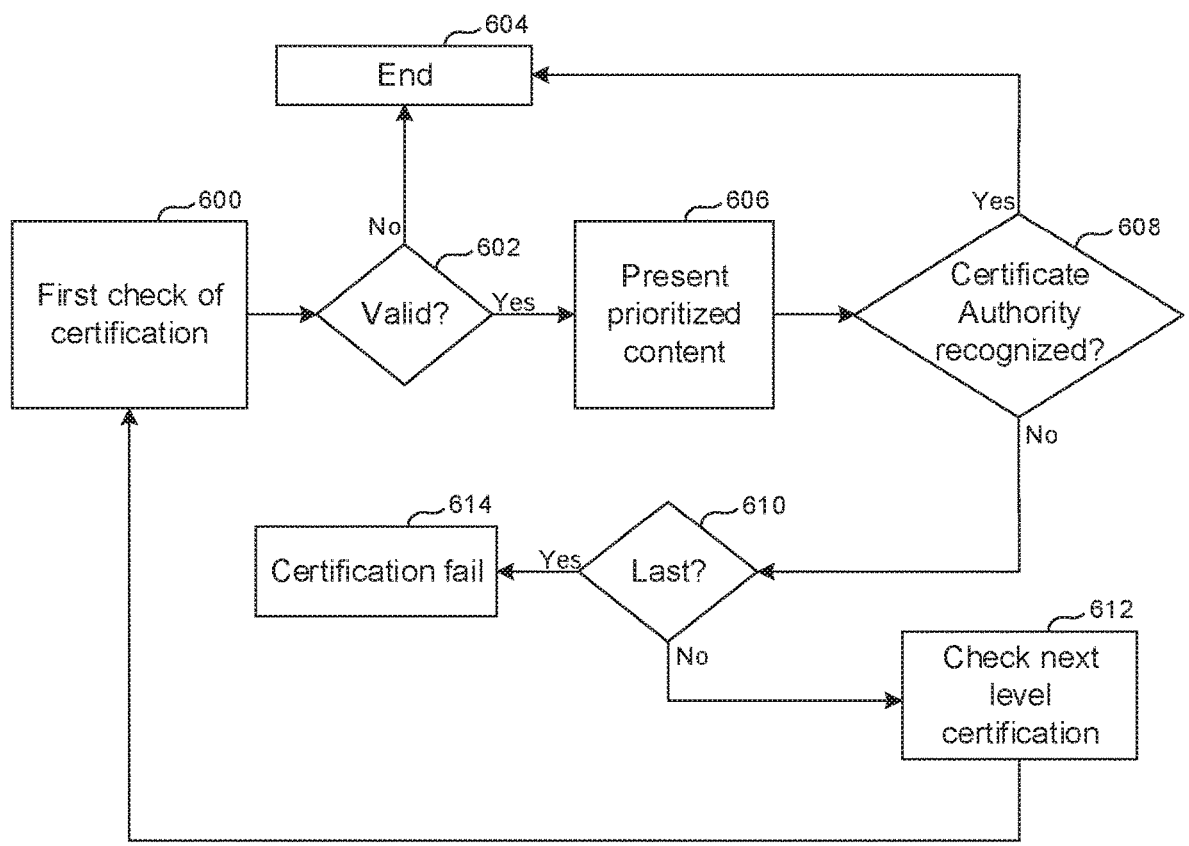
FIG. 6 is a flow chart of example logic illustrating a specific embodiment consistent with present principles.

FIG. 6 uses flow chart form to illustrate example logic for a specific implementation. Commencing at block 600, upon an event requiring a security certificate check, e.g., channel change/access of a broadband ATSC 3.0 channel which requires execution of a broadcaster application (BA), the end-entity certificate 300 (e.g., that may be associated with the BA) is checked at block 600. The check at block 600 determines whether the certificate has been signed correctly (e.g., by following the correct format.) If at decision diamond 602 it is determined that the certificate was not properly signed, the process ends at block 604.

However, if, at decision diamond 602, it is determined that the certificate was properly signed, the application optionally may be executed such that content is immediately presented at block 606. Content may be prioritized for initial presentation. It is also determined at decision diamond 608 whether the CA associated with the certificate is recognized as trusted such as by determining whether the CA's public key is in a trusted certificates store, and if the CA is recognized, the process may end at block 604 without further certificate checks. The trust test of the CA may occur before or after the signature check. It is to be appreciated, however, that the application is executed to present content responsive to determining that the first SC is correctly signed, regardless of whether the trust check of the CA passes.

Thus, when the certificate has a valid signature but the associated CA is not recognized, as the application may or may not be executed to begin immediate presentation of content, the logic may move to decision diamond 610 to determine whether the certificate under test is the last in the certificate chain, e.g., if it was the root certificate. If not, the next level certificate (in the example of FIG. 3, the intermediate certificate 302) is checked at block 612 for a valid signature, which is tested at decision diamond 602. If the next level certificate is found to be valid the logic continues to present content at block 606 and checks whether the CA of the next level certificate is recognized at diamond 608.

Figure 7:
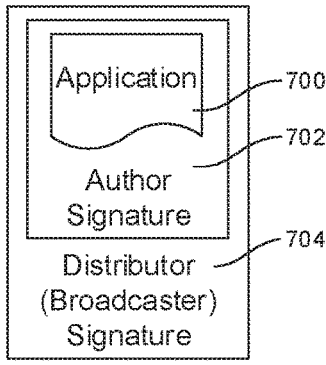
FIG. 7 is a diagram showing a nested signature scheme.
Figure 8:
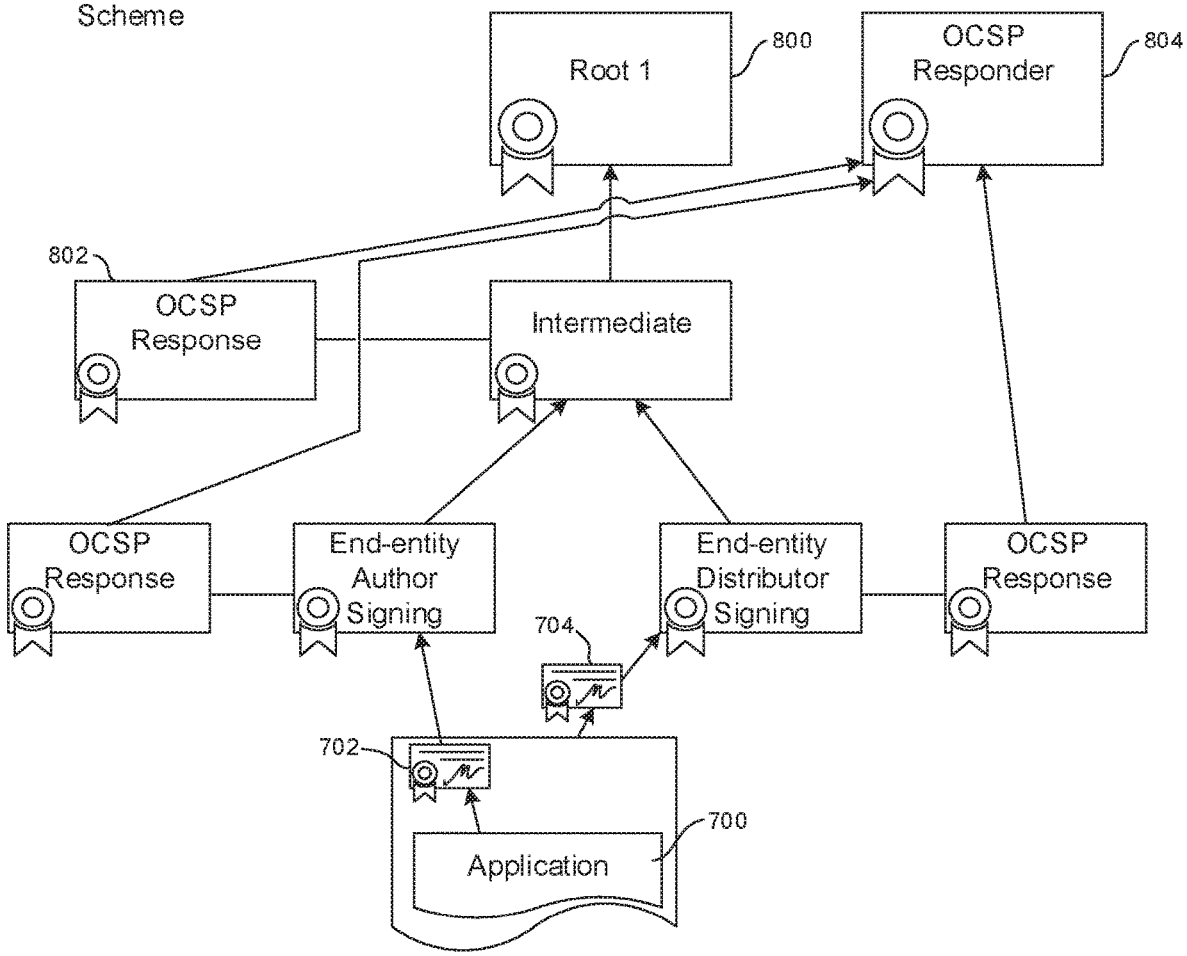

Note that the logic at state 608 can be more than just "CA recognized". For example, and referring briefly to FIGS. 7 and 8, an application 700 may be signed with an author signature 702 nested within a distributor or broadcaster signature 704 in a nested signature scheme. As may be appreciated in reference to FIG. 8, each certificate in the chain (except the root(s) 800) is signed using the parent certificate's private key, and the signature needs to be verified using the parent certificate's public key. Also, each certificate in the chain (except the root(s) 800) have an associated online certificate status protocol (OCSP) response 802, which is a particular sort of certificate which attests that the certificate has not been revoked as of a particular date/time. The OCSP responses each also have a certificate chain to a root 804 to verify the trust of the OCSP responses.

The process continues until either a CA is recognized at diamond 608 or the last (root) certificate 304 in the chain has been tested and has found at decision diamond 610 to have an unrecognized CA, in which case the process ends at block 614 and content initially presented at block 606 ceases to be presented and the application is torn down (unloaded from memory). At block 614, a virus check on the receiver may be executed after stopping execution of the application and if desired flushing the application from memory, or other protective steps may be taken, on the basis that the application may have been malware.

Thus, satisfying an initial minimal security check is sufficient to initiate content presentation. In this technique, if one validation passes at decision diamond 602, the app being validated is started at block 606 as validation proceeds to the root, if necessary, to verify. If any validation step (signature check) fails, the app is terminated. This gives conditional access to the app.

Figure 9:
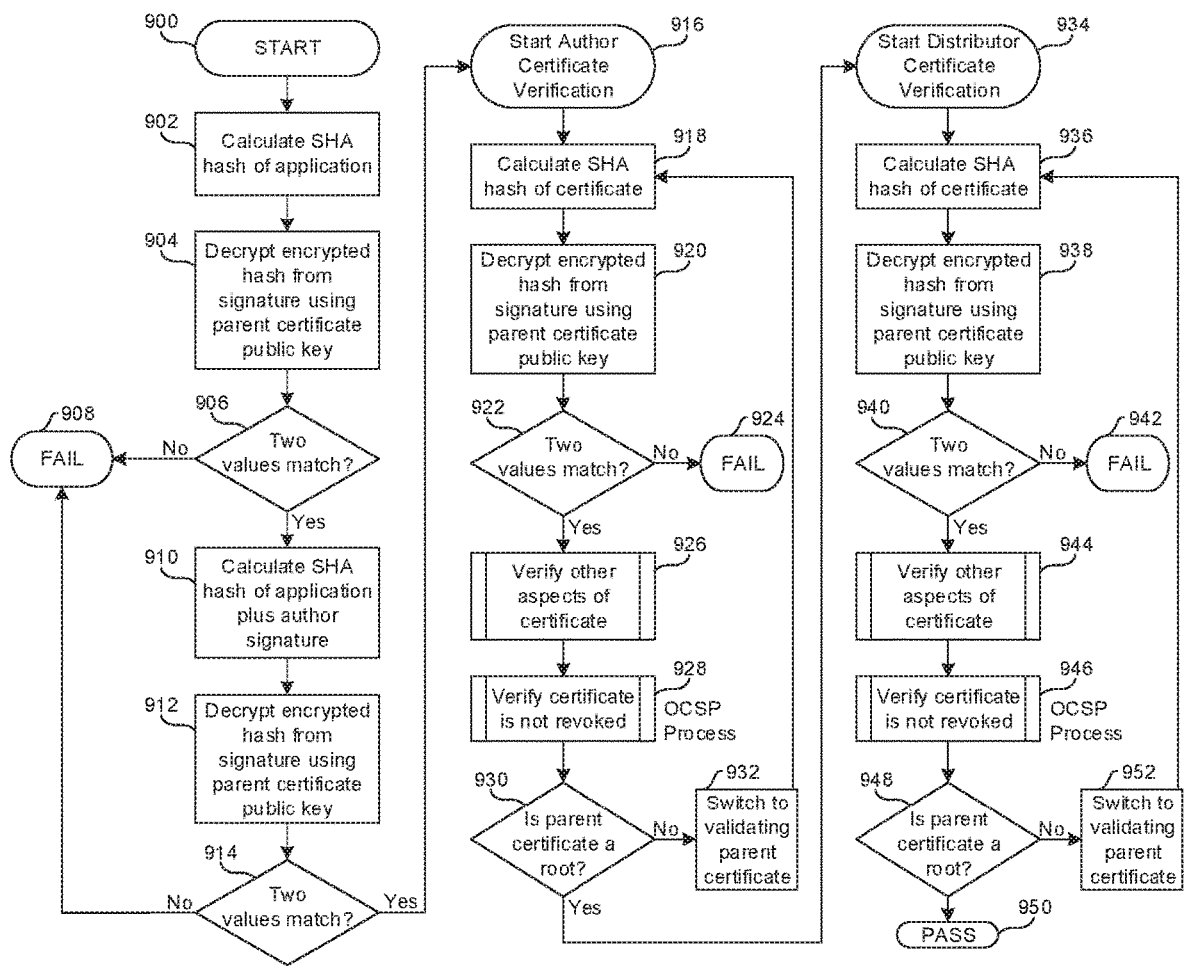
FIG. 9 is a flow chart of a detailed verification embodiment; it being understood that application launch can occur and the application (at least temporarily) executed after any successful verification step in FIG. 9.

Referring now to FIG. 9, a comprehensive example is shown of a lengthy string of validation steps for full verification. The logic starts at state 900 and at state 902, the hash (also known as message digest) of the application is calculated, e.g., using the secure hash algorithm (SHA-256). Moving to state 904, the encrypted hash from the signature accompanying the application is decrypted using signature's parent certificate public key, and if at state 906 the determinations at blocks 902 and 904 do not match, validation fails at state 908.

On the other hand, if the validation at state 906 passes the logic moves to blocks 910 and 912 to respectively calculate the SHA hash of the application plus the author signature and decrypt the encrypted hash from the signature using the parent certificate public key, and if the two do not match at state 914 fail is returned. If the two match at state 914 the logic continues to state 916 to start author certificate verification. Proceeding from state 916 to block 918, the SHA hash of the certificate is calculated. Moving to state 920, the encrypted hash from the signature of the certificate is decrypted using certificate's parent certificate public key, and if at state 922 the determinations at blocks 920 and 918 do not match, validation fails at state 924.

On the other hand, if the validation at state 922 passes the logic moves to state 926 to verify other aspects of the certificate and then to block 928 to verify using an OCSP process that the certificate is not revoked. Proceeding to decision diamond 930 it is determined whether the parent certificate is a root certificate and if it is not the logic moves to state 932 to begin validating the parent certificate. The logic loops from block 932 to block 918 as shown.

On the other hand, if it is determined that the parent certificate is a root certificate the logic moves to state 934 to begin verification of the distributor certificate. Proceeding from state 934 to block 936, the SHA hash of the certificate is calculated. Moving to state 938, the encrypted hash from the signature of the certificate is decrypted using certificate's parent certificate public key, and if at state 940 the determinations at blocks 936 and 938 do not match, validation fails at state 942.

On the other hand, if the validation at state 942 passes the logic moves to state 944 to verify other aspects of the distributor certificate and then to block 946 using an OCSP process that to verify the distributor certificate is not revoked. Proceeding to decision diamond 948 it is determined whether the parent certificate is a root certificate, and if it is validation completely passes at state 950. Otherwise, validation of the parent certificate is commenced at state 952 and the logic loops from there back to block 936.

Thus, among other things the author signature must match the SHA hash of the application data, the distributor signature must match the SHA hash of the application data plus author signature, the author signing the certificate must validate up the chain, the author certificate must validate OCSP (revocation) processing, as must each certificate up the chain, and the broadcaster certificate must validate OCSP processing, as must each certificate up the chain. Each certificate, from the end-entity certificate must have the correct fields and values for the purpose (signing).

The flowchart of FIG. 9 shows a particular order (verify both signatures, verify author cert chain fully, verify distributor certificate chain fully), but the order of the checks may vary. For example, if both signatures validate and the two end-entity certificates validate, and the two end-entity certificates pass OCSP revocation processing, that might be sufficient to begin execution of the application. Or, if both signatures validate, and the two end-entity certificates validate, and they both meet at a single intermediate certificate, and that intermediate certificate validates, that might be sufficient to begin execution of the application (before doing any OCSP revocation processing). It will be appreciated that whilst present principals have been described with reference to some example embodiments, these are not intended to be limiting, and that various alternative arrangements may be used to implement the subject matter claimed herein.

What is claimed is:

1. A digital television system comprising:
  at least one receiver configured to receive digital TV content from a transmitter assembly comprising at least one broadcast source and at least one broadband source, the receiver comprising:
  at least one processor programmed with instructions to:
  establish a number of steps of a multi-step validation to be executed before loading at least one application received from the transmitter assembly, the multi-step validation comprising an initial step, a final step, and plural intermediate steps therebetween;
  identify a call to load and execute the at least one application;
  based on the identified call, commence the multi-step validation, wherein a respective security certificate is validated in each step of the initial step, the final step, and the plural intermediate steps;
  responsive to successful validation of at least a first step within the multi-step validation, commence loading the at least one application into a memory, the at least the first step corresponding to at least one step in the established number of steps of the multi-step validation and not including the final step; and
  responsive to unsuccessful validation of any step after the first step is validated, unload the at least one application from the memory.

2. The digital television system of claim 1, wherein the at least one application comprises an advanced television systems committee (ATSC) 3.0 broadcaster application configured to insert replacement content into the content received by the receiver from the transmitter assembly.

3. The digital television system of claim 1, wherein the at least one application comprises an advanced television systems committee (ATSC) 3.0 broadcaster application configured to present a user interface.

4. The digital television system of claim 1, wherein the digital television system comprises an advanced television systems committee (ATSC) 3.0 system.

5. The digital television system of claim 1, wherein the instructions are executable to:
  commence execution of the at least one application after loading the at least one application and prior to completing validation of the at least one application.

6. The digital television system of claim 1, wherein the first step is the initial step.

7. The digital television system of claim 1, wherein the first step is one of the intermediate steps.

8. A method, comprising:
  establishing a number of steps of a multi-step validation to be executed before loading at least one application received from a digital television transmitter assembly, the multi-step validation comprising an initial step, a final step, and plural intermediate steps therebetween;
  identifying a call to load and execute the at least one application;
  based on the identified call, commencing the multi-step validation, wherein a respective security certificate is validated in each step of the initial step, the final step, and the plural intermediate steps;
  responsive to successful validation of at least a first step within the multi-step validation, commencing loading the at least one application into a memory, the at least the first step corresponding to at least one step in the established number of steps of the multi-step validation and not including the final step; and
  responsive to unsuccessful validation of any step after the first step is validated, unloading the at least one application from the memory.

9. The method of claim 8, wherein the at least one application comprises an advanced television systems committee (ATSC) 3.0 broadcaster application configured to insert replacement content into content received from the digital television transmitter assembly.

10. The method of claim 8, wherein the at least one application comprises an advanced television systems committee (ATSC) 3.0 broadcaster application configured to present a user interface.

11. The method of claim 8, wherein the digital television transmitter assembly comprises an advanced television systems committee (ATSC) 3.0 system.

12. The method of claim 8, comprising:
  commencing execution of the at least one application after loading the at least one application and prior to completing validation of the at least one application.

13. The method of claim 8, wherein the first step is the initial step.

14. The method of claim 8, wherein the first step is one of the intermediate steps.

15. A computer readable medium that is not a transitory signal and that comprises instructions executable by at least one processor to:
  establish a number of steps of a multi-step validation to be executed before loading at least one application received from a digital television transmitter assembly, the multi-step validation comprising an initial step, a final step, and plural intermediate steps therebetween;
  identify a call to load and execute the at least one application;
  based on the identified call, commence the multi-step validation, wherein a respective security certificate is validated in each step of the initial step, the final step, and the plural intermediate steps;

responsive to successful validation of at least a first step within the multi-step validation, commence loading the at least one application into a memory, the at least the first step corresponding to at least one step in the established number of steps of the multi-step validation and not including the final step; and responsive to unsuccessful validation of any step after the first step is validated, unload the at least one application from the memory.

16. The computer readable medium of claim 15, wherein the at least one application comprises an advanced television systems committee (ATSC) 3.0 broadcaster application configured to insert replacement content into content received by a digital television receiver from the digital television transmitter assembly.

17. The computer readable medium of claim 15, wherein the at least one application comprises an advanced television systems committee (ATSC) 3.0 broadcaster application configured to present a user interface.

18. The computer readable medium of claim 15, wherein the digital television transmitter assembly comprises an advanced television systems committee (ATSC) 3.0 system.

19. The computer readable medium of claim 15, wherein the instructions are executable to:

commence execution of the at least one application after loading the at least one application and prior to completing validation of the at least one application.

20. The computer readable medium of claim 15, wherein the first step is the initial step.

21. The computer readable medium of claim 15, wherein the first step is one of the intermediate steps.

\* \* \* \* \*